United States Patent

Lisa

[11] 3,754,327
[45] Aug. 28, 1973

[54] COOKIE CUTTERS
[75] Inventor: Mary Ann Lisa, Hoboken, N.J.
[73] Assignee: The Raymond Lee Organization, Inc., New York, N.Y.
[22] Filed: Jan. 26, 1972
[21] Appl. No.: 220,781

[52] U.S. Cl................... 30/316, 99/494, 118/15
[51] Int. Cl............................... B26b 3/00
[58] Field of Search................. 30/123.3, 130, 301, 30/316; 99/494; 118/15, 35

[56] References Cited
UNITED STATES PATENTS
2,907,129  10/1959  Bedell.................... 118/35
2,379,140  6/1945   Frank..................... 30/130 X
2,612,123  9/1952   Nord..................... 30/316

OTHER PUBLICATIONS
M. P Prater, IBM Bulletin, Feb. 1959, Hole Marking Punch, Vol. 1, No 5

Primary Examiner—Harold D. Whitehead
Assistant Examiner—J. C. Peters
Attorney—Richard S. Shreve, Jr.

[57] ABSTRACT

A cookie cutter is provided with openings extending inward from the outer surface to felt tips on the inner cookie contacting surface. Edible liquid coloring material can be inserted into the openings whereby each cookie is automatically decorated as it is cut from sheet of cookie dough.

1 Claim, 4 Drawing Figures 3,754,327

COOKIE CUTTERS

FIELD OF THE INVENTION

Cookies can be cut out of sheets of cookie dough with ease by means of cookie cutters. However, each cookie must be individually decorated thereafter. This involves extensive tedious repetitive effort, particularly when the decoration is complicated as for example on cookies resembling witches for use in Halloween festitities or as another example cookies resembling rockets used by astronauts.

SUMMARY

In my invention, properly shaped cutters are provided with openings communicating with felt tips on the inner cookie contacting surface. Suitably colored edible liquid material can be inserted into each opening. As the cutter is pressed into the sheet, the tips contact the cookie surface to suitably decorate it. My cutter thus both cuts and decorates in one operation whereby it is only necessary to bake the cut and decorated cookies to complete the procedure.

Figure 1:
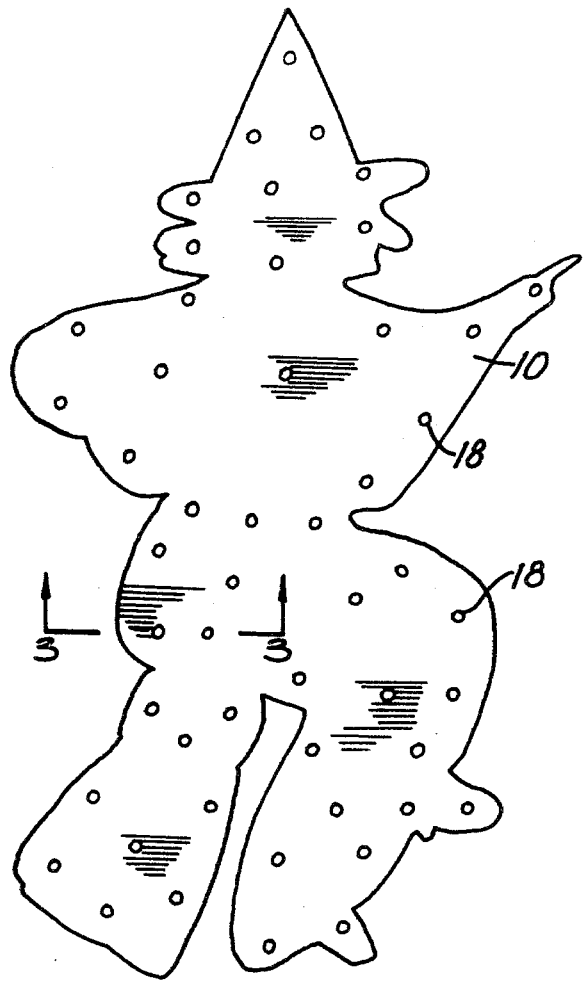
FIG. 1 is a plan of one type of cutter in accordance with my invention.
Figure 2:
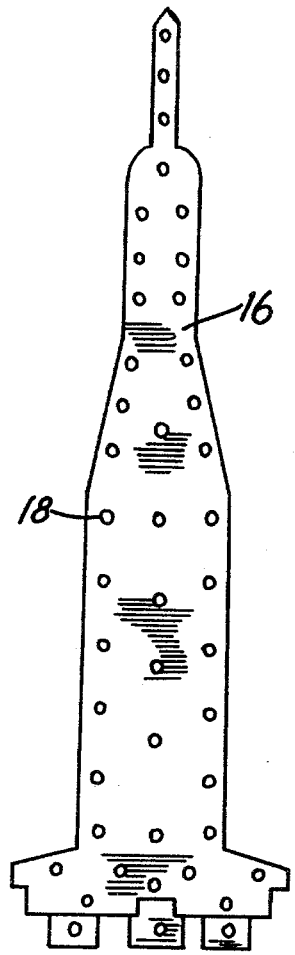
FIG. 2 is a plan of another type of cutter in accordance with my invention.
Figure 3:
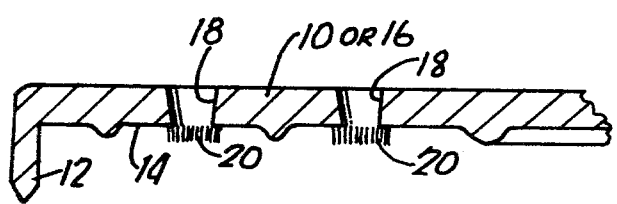
FIG. 3 is a section taken along line 3—3 in FIG. 1.
Figure 4:
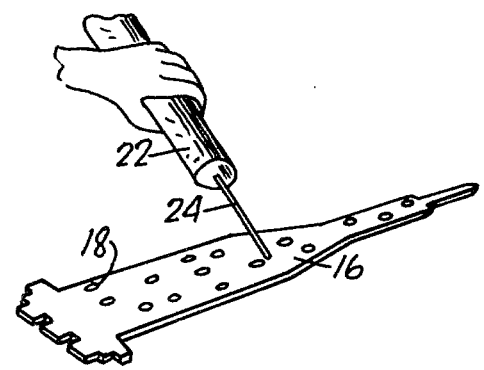
FIG. 4 is a perspective which illustrates a step in using my invention.

DETAILED DESCRIPTION OF PREFERRED EMBODIMENTS:

Referring now to FIGS. 1-4, a cutter can have a flat horizontal plate 10 shaped to resemble a witch with downwardly extending peripheral cutting edges 12 and with an inner surface 14 contoured as desired to form the cookie accordingly.

A similar plate 16 can be shaped to resemble a rocket or other structure used by astronauts.

In either case, in order to provide decorations as required, each plate is provided with spaced openings or bores 18 which in cross section define truncated cones and taper downward and inward from the outer surface of the cutter to inner surface 14. A felt tip 20 is disposed at the smaller end of each bore.

Prior to use, each bore is filled or charged with a suitable viscous liquid of edible selected coloring material as for example by using squeeze tube 22 having an elongated thin discharge nozzle 24. The bore then acts as a reservoir and a plurality of cookies can be cut and simultaneously decorated by contact with the tips before the bores need to be refilled. The cookies so cut and decorated need only to be baked as previously described.

While I have described my invention with particular reference to the drawings, such is not to be considered as limiting its actual scope.

Having thus described this invention, what is asserted as new is:

1. A cookie cutter comprising a suitably shaped plate having peripherally disposed cutting edges extending at right angles thereto;

said plate having a plurality of spaced bores extending between the outer and inner surfaces of the plate; and a like plurality of felt tips, each tip being disposed on the inner surface and communicating with the corresponding bore;

wherein each bore contains a suitably coloured edible fluid.

* * * * *